(12) United States Patent
Carew

(10) Patent No.: US 10,151,536 B2
(45) Date of Patent: Dec. 11, 2018

(54) CONTROLLING EVAPORATIVE COOLING TOWER CHEMISTRY

(71) Applicant: Patrick Henry Carew, Oak Park, IL (US)

(72) Inventor: Patrick Henry Carew, Oak Park, IL (US)

(*) Notice: Subject to any disclaimer, the term of this patent is extended or adjusted under 35 U.S.C. 154(b) by 984 days.

(21) Appl. No.: 14/209,360

(22) Filed: Mar. 13, 2014

(65) Prior Publication Data
US 2014/0260370 A1 Sep. 18, 2014

Related U.S. Application Data

(60) Provisional application No. 61/779,723, filed on Mar. 13, 2013.

(51) Int. Cl.
| | | |
|---|---|---|
| *F28C 1/00* | (2006.01) | |
| *C02F 1/00* | (2006.01) | |
| *C02F 1/42* | (2006.01) | |
| *F28F 25/00* | (2006.01) | |
| *C02F 103/02* | (2006.01) | |

(52) U.S. Cl.
CPC .............. *F28C 1/00* (2013.01); *C02F 1/008* (2013.01); *C02F 1/42* (2013.01); *F28F 25/00* (2013.01); *C02F 2001/425* (2013.01); *C02F 2103/023* (2013.01); *C02F 2209/05* (2013.01); *C02F 2209/10* (2013.01); *F28F 2025/005* (2013.01)

(58) Field of Classification Search
CPC .... F28C 1/00; C02F 1/008; C02F 1/42; C02F 2209/10; C02F 2001/425; C02F 2103/023; C02F 2209/05; F28F 25/00; F28F 2025/005
See application file for complete search history.

(56) References Cited

U.S. PATENT DOCUMENTS

| | | | |
|---|---|---|---|
| 3,450,265 A | * | 6/1969 | Kreusch .............. F28F 25/02 210/140 |
| 4,320,010 A | | 3/1982 | Tucci |
| 4,931,187 A | | 6/1990 | Derham |
| 6,746,609 B2 | | 2/2004 | Stander |
| 7,329,338 B2 | | 2/2008 | Sieth |

(Continued)

FOREIGN PATENT DOCUMENTS

KR  20100109157 A  * 10/2010

OTHER PUBLICATIONS

Noh et al., Water Purifier Capable of Reducing Water Comsumption, Oct. 8, 2010, KR20100109157A, Whole Document.*

(Continued)

*Primary Examiner* — Larry Furdge
(74) *Attorney, Agent, or Firm* — Seyfarth Shaw LLP; Brian Michaelis

(57) ABSTRACT

The automatic reset of an evaporative cooling water dissolved solids set point based on detection of water softener performance is provided. A controller has a sensor, or is given an input signal, which confirms that the softener is operating properly. Positive confirmation of water softener performance allows the controller to maintain a user specified high total dissolved solids set point in the evaporative cooling water. Should a failure of the softener be detected, the controller then maintains a user specified lower total dissolved solids set point.

20 Claims, 2 Drawing Sheets

(56) References Cited

U.S. PATENT DOCUMENTS

| | | | |
|---|---|---|---|
| 7,556,738 B2* | 7/2009 | Premathilake | B01J 49/85 210/662 |
| 7,595,000 B2 | 8/2009 | Keister | |
| 2003/0052060 A1* | 3/2003 | Teel, Jr. | C02F 1/42 210/662 |
| 2005/0000902 A1* | 1/2005 | Newenhizen | B01D 3/346 210/670 |
| 2008/0023409 A1* | 1/2008 | Owens | C02F 5/02 210/709 |

OTHER PUBLICATIONS

Yokogawa, Application Note: Cooling Tower, 2008, AD-A-003, http://www.yokogawa.com/us, USA.

Thomas Klenck, How It Works: Water Softener, Popular Mechanics, Aug. 1, 1998, http://www.popularmechanics.com/home/improvement/interior/1275126.

William F. Harfst, Conserve Water by Improving Cooling Tower Efficiency, Power, Jan. 1, 2009, http://www.powermag.com/conserve-water-by-improving-cooling-tower-efficiency/.

* cited by examiner

CONTROLLING EVAPORATIVE COOLING TOWER CHEMISTRY

CROSS-REFERENCE TO RELATED APPLICATIONS

The present application claims priority to provisional application No. 61/779,723, filed Mar. 13, 2013, the contents of which are hereby incorporated by reference in their entirety.

FIELD OF THE INVENTION

The present invention relates to control of evaporative cooling machines and systems, and more particularly to maintaining a desired chemical range or state for the coolant.

BACKGROUND

Currently, much of industrial and commercial cooling in a heat exchange is conducted by the use of evaporative cooling. Water in a re-circulating system absorbs heat from somewhere in a facility, building or a process (manufacturing, data processing, environmental control, and so forth), and then expels that latent heat, as to the atmosphere. Oftentimes in larger facilities like manufacturing or office buildings, this is by means of the coolant, typically water, being sprayed or spread in thin films while exposed to air moved by fans. This allows the water both to contact the cooler air and to transfer or release some of its heat energy by means of evaporation.

When water is evaporated as part of a cooling process, it leaves in the remaining water, or reservoir, its own dissolved minerals, albeit in much small concentrations. As fresh water is added to the system to make-up for the lost evaporated water, it too has its dissolved minerals. Thus, the overall level of dissolved mineral ions increases as heat is dissipated from the system in the form of lost moisture through evaporation.

Among the dissolved solids are so-called hard minerals like calcium and magnesium, which at certain concentrations precipitate out to form lime scale. In order to prevent these increased concentrations, total dissolved solids are typically monitored by means of the conductivity of the water. High dissolved solids water is removed, such as bled off through an automatic valve. Fresh water which is added to the system to make-up for the drained water then serves to dilute the dissolved solids in the overall system, and lowers the dissolved solids levels.

In theory, a water softener can replace the troublesome build-up of calcium and magnesium ions with sodium ions. Sodium ions do not harmfully precipitate. The art of cation resin water softening is well established and in wide use. The replacement of calcium and magnesium ions with sodium ions via water softening considerably raises the level of dissolved solids allowable in an evaporative cooling system. This, in turn, reduces the need for draining off system water and replacing it with fresher water, but replacement still must occur over time.

In general the industrial world is facing a scarcity of fresh water resources and consumers of water, private and commercial, are experiencing considerable increases in water costs. Evaporative cooling uses a large portion of the water consumed in commerce, institutions, and industry. In order to realize water conservation objectives, evaporative cooling systems operators are looking to raise the total dissolved solids levels in their re-circulating cooling water.

While treating the reservoir water in a "softening" process is possible, there are distinct draw backs. First, the water softener mechanism requires regular replenishment of solid salt. Second, water softeners are prone to some degree of mechanical failure, and significant intervention or service is occasionally required. Should the water softener have a problem producing soft water, either because of mechanical failure or failure to replenish the solid salt, the evaporative cooling system will experience an increase in hardness mineral concentration.

If the softener fails and the total dissolved solids setting is not lowered to concentrations below the threshold where lime scale precipitates, then substantial fouling will ensue. Thus, the need exists to monitor water softener performance and to automatically reset the evaporative cooling tower dissolved solids settings if it is likely that hardness minerals are entering the evaporative cooling system water.

A number of patents have addressed the use of water softeners for evaporative cooling, and some use a sensor array to determine water conditions and subsequently send water the system water through a softening bed. Such are U.S. Pat. No. 4,931,187, U.S. Pat. No. 7,595,000, and U.S. Pat. No. 6,746,609. None test the softener for it performance.

Some patents use conductivity sensors to monitor softener conditions, but none (as far as the Applicant herein understands), detect brine water in the drain line. None are integrated with evaporative cooling tower water chemistry. Such are U.S. Pat. No. 4,320,010, U.S. Pat. No. 7,556,738 and U.S. Pat. No. 7,329,338.

SUMMARY

In a first aspect of the this invention, a multi-function total dissolved solids controller (hereafter MFTDS unit) is provided, generally comprising a water volume sensor reading the water volume added to the evaporative cooling system. This water volume sensor is, in one embodiment, attached to a water meter which issues a contact closure signal when a set volume of water has passed through, that signal may be to initiate an automatic reset sequence. Further, a dissolved solids sensor monitors the total dissolved solids in the cooling system via the electrical conductivity of the water. A bleed valve controlled by the MFTDS unit is used to maintain a total dissolved solids range in the cooling system. More particularly, when the MFTDS dissolved solids sensor unit senses the total dissolved solids to be too high, this bleed valve is actuated to bleed water to drain. In conjunction with the bleed off, diluting fresh water (or at least fresher water) is caused to enter the system.

In this embodiment, there is a softener sensor in the drain line of a water softener in the cooling system to detect that a softener regeneration is required. This softener sensor measures the electrical conductivity of the water which passes through the softener drain line, to determine a threshold level indicating that softener regeneration is needed.

A user interface is provided on the MFTDS unit to program in: the water volume or time within which a softener regeneration should occur; the low total dissolved solids set point (if softener performance is not confirmed or a softener fault is detected); and the high total dissolved solids set point (when the softener is deemed to be operating).

In another aspect of the invention, a method for controlling evaporative cooling total dissolved solids has a water softener mechanism including a brine reservoir. A brine sensor which senses electrical conductivity of the water in the brine reservoir is provided.

In this method, an evaporative cooling system has a cooling water reservoir, a heat exchanger for absorbing latent heat, an evaporative chamber having a water distribution mechanism and a blower mechanism for an airflow to facilitate water evaporation and moisture transfer, a water meter which registers water volume into the cooling system, and a pumping circuit including conduit for circulating water throughout the cooling system.

A total dissolved solids (TDS) sensor is provided which detects the level of dissolved solids in the cooling water reservoir. This method further provides a controller with a user interface, the controller receiving signals from the TDS sensor, the water meter and brine sensor, and being programmed by a user to start a regeneration cycle in the softener mechanism at a threshold level set by the user selected from one or more of water meter volume detected and dissolved solids detected by the TDS sensor.

In accordance with a version of the foregoing method, the controller is programmed to remove water from the cooling water reservoir at a threshold level of dissolved solids detected by the TDS sensor, and then replace removed water in the reservoir with water of a lower dissolved solids level.

In another aspect of the invention, a system for operating an evaporative cooling assembly includes a cooling water circuit having a water input, a water volume sensor reading the water volume added to the cooling water circuit, a cooling water reservoir, a heat exchanger for transferring latent heat to cooling water, an evaporative mechanism which evaporates cooling water to release latent heat, a dissolved solids sensor reading the total dissolved solids in the cooling water, and a bleed valve through which water is removed from the cooling water circuit.

A multi-function total dissolved solids controller (MFTDS) has a user interface by which the MFTDS unit is used to maintain a total dissolved solids range in the cooling water circuit. The MFTDS is in communication with the dissolved solids sensor, and may be set by the user to a threshold level of total dissolved solids, whereupon the MFTDS operates the bleed valve to drain cooling water from the cooling water circuit, and replace drained water with fresher water through the water input.

In a particular version of the foregoing system, a water softener mechanism has a brine reservoir and a brine sensor which senses electrical conductivity of the water in the brine reservoir. The MFTDS is in communication with the brine sensor, and the MFTDS is set by a user to detect a threshold level where a regeneration cycle for the water softener is to be engaged.

The foregoing system may advantageously further include a water meter which registers water volume into the cooling water circuit, and a pumping circuit including conduit for circulating water throughout the cooling water circuit. Here, the MFTDS unit is used to determine one or more of: the water volume or time within which a softener regeneration should occur, or a high total dissolved solids set point.

These and other aspects, advantages, features and details of the invention will be further understood in consideration of the following detailed description of certain embodiments, taken in conjunction with the drawings, in which:

DETAILED DESCRIPTION

While the invention has been described herein with respect to specific examples, including presently preferred modes of carrying out the invention, those skilled in the art will appreciate that there are numerous variations and permutations of the above described systems and techniques that fall within the spirit and scope of the invention.

The present invention generally relates to the regulation of total dissolved solids in the water of an evaporative cooling system based, in one aspect, upon the determination of water softener performance. The present invention can be effectively used to maintain the total dissolved solids operating level in an evaporative cooling system when a desired range, or below a pre-set desired level, and thereby allowing operators of evaporative cooling systems both conserve water and to protect their heat exchange equipment. There may, of course, be other applications of the invention besides in the environment of the kind of evaporative cooling system specifically described hereafter, and this detailed description is not intended to be limiting, but exemplary.

As discussed previously, evaporative cooling systems (e.g., cooling towers, evaporative condensers, fluid coolers) transfer or reject waste heat to the atmosphere by means of exposing re-circulating water to outside air. Much of the heat absorbed in the process is carried away by water vapor coming off the evaporative cooler. As the water becomes vapor, dissolved minerals remain behind in the re-circulating water reservoir. Thus the evaporative cooling water in the system over time can become more and more concentrated with dissolved minerals.

Calcium and magnesium are naturally occurring minerals found dissolved in most waters. Calcium and magnesium ions are commonly known as reflecting a water's "hardness." At a certain level of concentration, these ions will precipitate out forming a dense solid known as lime scale. Heat is a strong driver in precipitation, and thus lime scale tends to form on heat exchange surfaces. Lime scale acts as insulation causing at first a loss of energy transfer efficiency, and eventually a breakdown of the cooling system.

Figure 1:
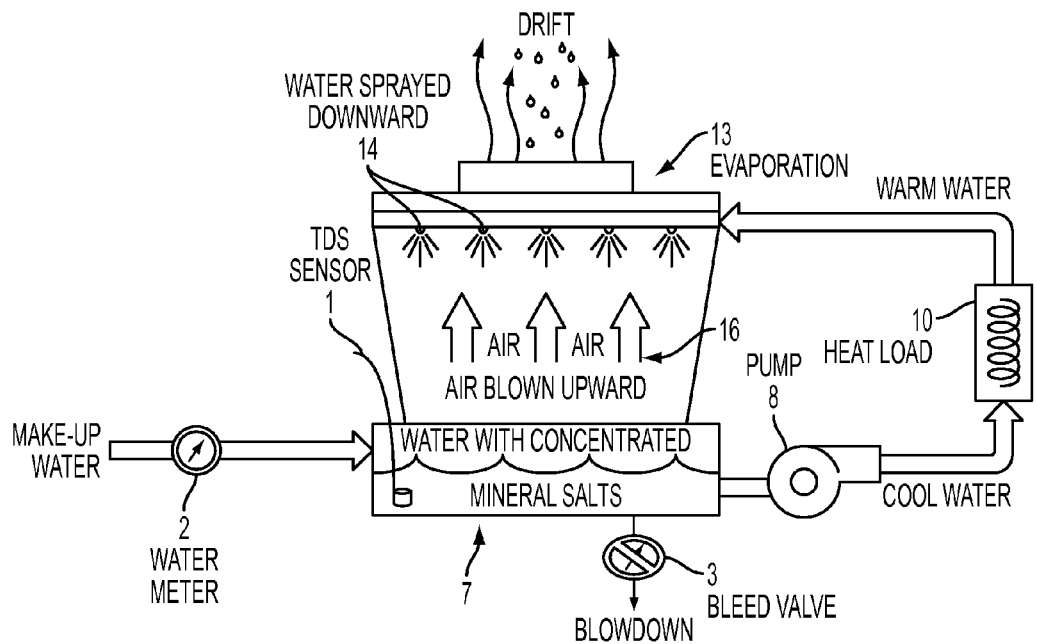
FIG. 1 is a schematic view of an evaporative cooling system, showing the circuit of heat transfer from internal heat load (environmental cooling, data processing equipment cooling, industrial machine cooling) to heat transfer to the atmosphere.

As shown in the FIG. 1, a total dissolved solids sensor 1 (hereafter a TDS Sensor) is used in evaporative cooling systems to monitor the amount of dissolved minerals in the system. With or without chemical additives, a certain threshold of dissolved ions exists beyond which lime scale precipitates. Most evaporative cooling systems use a bleed valve 3 which opens to drain off water heavily laden with dissolved solids. This lost, highly concentrated with solids water, is then replaced with fresh (or at least fresher) water. Fresh water has a lower level of dissolved solids, and thus it dilutes the re-circulating water to preferably non-precipitating levels of dissolved mineral concentration.

FIG. 1 shows a general evaporative cooling system having a water meter 2 which measures water flow, a reservoir generally indicated at 7, a pump 8 or pumps for water movement, and a heat exchanger mechanism 10 which transfers latent heat from the facility (process or machinery) to the system water. The heated water is then input to an evaporative chamber (such as a coolant tower), which in this embodiment is generally comprised of sprayers 14 which spray the water into an airflow generated by blowers (indicated at 16). Evaporation occurs, with the vapor and airstream exiting from the chamber 12, as at the top thereof (indicated at 13).

Figure 2:
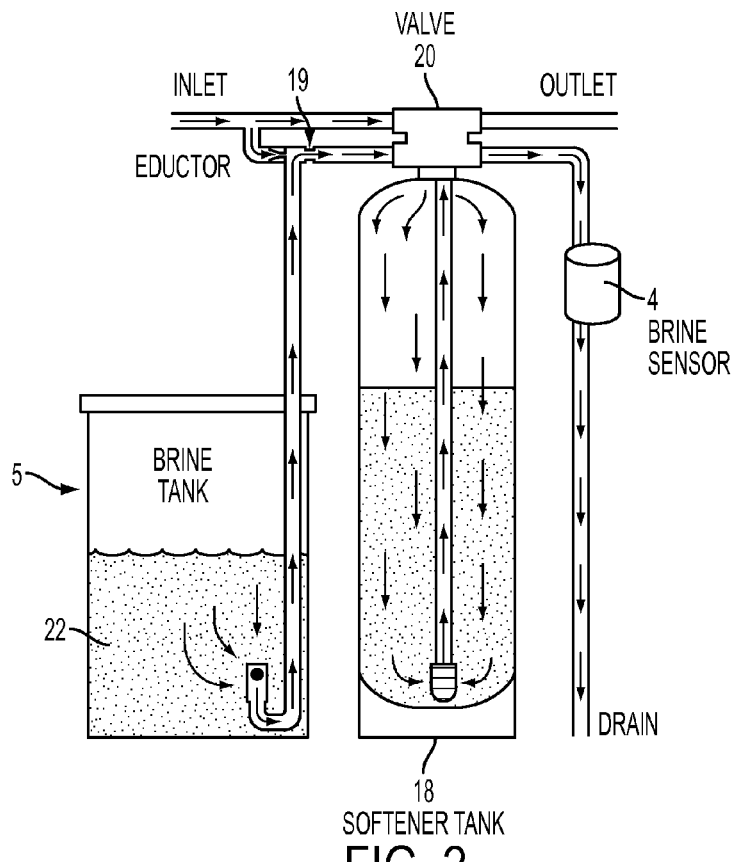
FIG. 2 is a schematic depiction of a water softener.

Water softeners, such as that shown in FIG. 2 (e.g., sodium zeolite softeners, cation exchangers, water conditioners) remove the dissolved calcium and magnesium minerals and replace them with sodium. Thus the precursors to lime scale are removed. Sodium ions are much safer from an operational point of view, because they do not precipitate out as a dense solid. Thus, the maximum allowable concentration of total dissolved solids within the evaporative cooling water can be greatly increased if those dissolved solids are largely sodium ions and not calcium and magnesium. This means less water wasted to drain, and overall water concentration.

Water softeners, however, have functional drawbacks. Solid salt in pellets, crystals or blocks must be regularly added to a brine tank 5. This requires a certain amount of human vigilance not always available where manpower is stretched. Also, all water softeners have inherent areas of potential failure. The salt water from the brine tank is drawn into a water resin tank 18 by means of a small orifice of an educator 7. The solid salt added sometimes contains grit which can clog this orifice, and subsequently regeneration does not occur. A control valve of the softener 20, which switches the unit through the stages of the regeneration cycle, can fail due to electrical or mechanical failure. The brine tank itself has a check valve 6 which from time to time may stick. Also, the salt pellets or crystals in the brine tank can become fused together or "bridged" and not dissolve. These problems normally require expert personnel to diagnosis and repair.

Figure 3:
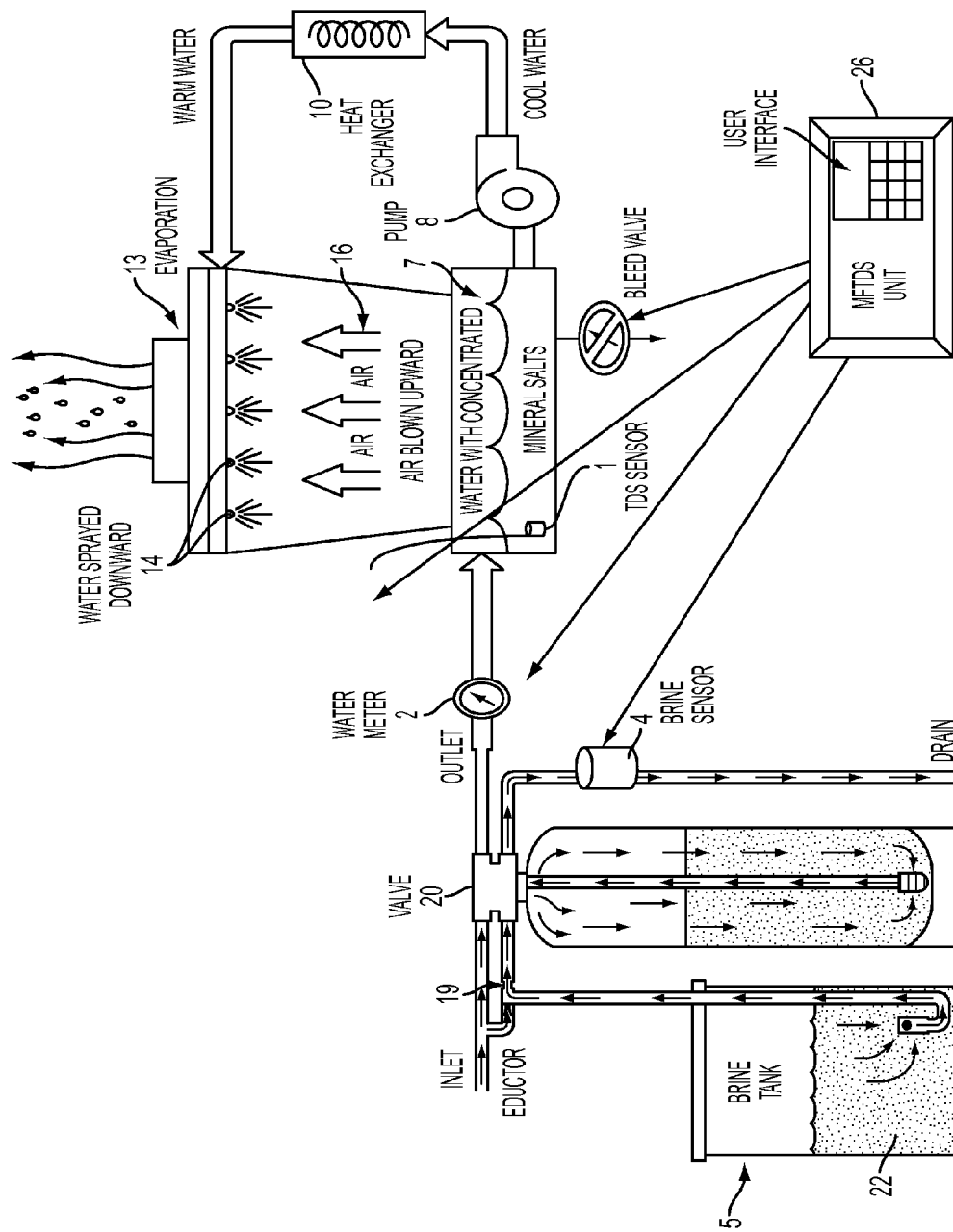
FIG. 3 is a schematic view of an embodiment of an MFTDS unit made in accordance with the present invention, with its sensors and controls deployed with a softener in an evaporative cooling system.

The present invention in one form integrates the performance of the water softener with the total dissolved solids set point in the evaporative cooling water. The total dissolved solids are measured by the analog of the electrical conductivity of the water. As shown in FIG. 3, a controller 26, referred to herein as the MFTDS, is in communication (e.g., wired) to the TDS sensor 1 in the evaporative cooling water circuit, and to the bleed valve 3. The user (operator) programs a high total dissolved solids set point for when the softener is deemed working at a desired state, and a low total dissolved set point for when a softener failure, or at least undesirable level, is detected.

An embodiment of the present invention uses a brine sensor 4 on the drain line which detects the conductivity of water sent to drain during the regeneration cycle of the softener. In this embodiment, the user programs a maximum volume of make-up water within which regeneration will occur. If regeneration is not detected (by electrical conductivity of the brine) before that programmed maximum volume is reached, the MFTDS controller 26 will reset the total dissolved solids set point to the lower setting. For example, if the softener is set to regenerate every 10,000 gallons of throughput, the user would program in 10,500 gallons maximum volume. Thus, if the volume of water added to the evaporative cooling system exceeds 10,500 gallons and regeneration is not detected by the brine sensor 4 the total dissolved solids setting will revert to the lower setting.

A type of controller used as the MFTDS is an Einstein advanced programmable logic controller made by Emerson Climate Technologies or like type programmable controllers. Also, a generic water treatment controller like those made by Walchem Corporation (i.e. the Webmaster), Advantage Controls (i.e. the Megatron), Lakewood Instruments (i.e. 2430e), and Pulsafeed (i.e. the Microvision) may be made to perform the functions here specified. Lastly, the electronic controls for the softeners themselves, like those manufactured by Clack Inc. and Pentair, can be used as platforms for MFTDS type controllers.

Another embodiment of the present invention uses time as a parameter within which regeneration is to be detected, and effected. A softener might be set to regenerate automatically every 24 hours, for example. Thus the user would program a maximum time of 25 hours into the MFTDS 26 in this instance. If regeneration is not detected via the brine sensor 4 within that time window, the total dissolved settings will be reset to the lower setting(s).

Another embodiment of the present invention contemplates some other indicator of softener performance as an input to the MFTDS unit 26. For instance, U.S. Pat. No. 4,320,010 and U.S. Pat. No. 7,556,728 specify other means of proofing water softeners. Also, the outflow from the softener can be analyzed by means of online water hardness analyzers. If an actionable level of hardness is detected coming out of the water softener, a signal sent to the MFTDS unit 26 will consequently reset the set points. The MFTDS unit 26 can accept an electrical on/off from any proprietary process of determining softener operation and based on that input maintain or reset evaporative cooling water total dissolved solids set points.

It should be understood that the operation of the present invention, which integrates water softener performance diagnostic with evaporative cooling water total dissolved solids (conductivity) set points, is not limited to a standalone MFTDS unit, as illustrated. The scope of this invention covers integration via other programmable logic controllers, including but not limited to: water softener controls, water chemistry control and feed devices, building automation systems, manufacturing, refrigeration, process control platforms or web-based or other off-site control systems.

Thus, while the invention has been described with respect to certain embodiments, variations and modifications will be recognized by those of skill in the art which will nonetheless come within the scope and spirit of the invention, as further set forth in the claims which follow.

What is claimed is:

1. A method for controlling evaporative cooling for total dissolved solids, comprising:

providing a water softener mechanism including a brine reservoir;

providing a brine sensor disposed within a drain line which senses electrical conductivity of water that passes through the drain line of the water softener mechanism during a regeneration cycle;

providing an evaporative cooling system with a cooling water reservoir, a heat exchanger for absorbing latent heat, an evaporative chamber having a water distribution mechanism and a blower mechanism for an airflow to facilitate water evaporation and moisture transfer, a water meter which registers water volume into the evaporative cooling system, and a pumping circuit including conduit for circulating water throughout the evaporative cooling system;

providing a total dissolved solids (TDS) sensor in the cooling water reservoir, which detects the level of dissolved solids in the cooling water reservoir; and providing a controller with a user interface, the controller receiving signals from the TDS sensor, the water meter and brine sensor, and being programmed via the user interface to start a regeneration cycle in the water softener mechanism at a threshold level set via the user interface and selected from one or more of water meter volume detected and dissolved solids detected by the TDS sensor.

2. The method of claim 1, further including programming the controller to remove water from the cooling water reservoir having a threshold level of dissolved solids detected by the TDS sensor, and replace removed water in the reservoir with water of a lower dissolved solids level.

3. A system for operating an evaporative cooling assembly, comprising:
   a cooling water circuit having a water input, a water volume sensor reading the water volume added to the cooling water circuit, a cooling water reservoir, a heat exchanger for transferring latent heat to cooling water, an evaporative mechanism which evaporates cooling water to release latent heat, a dissolved solids sensor in the cooling water reservoir that reads the total dissolved solids in the cooling water, and a bleed valve through which water is removed from the cooling water circuit;
   a water softener mechanism having a brine reservoir and a brine sensor disposed within a drain line which senses electrical conductivity of water that passes through the drain line of the water softener mechanism; and
   a multi-function total dissolved solids controller with a user interface by which the controller is used to maintain a total dissolved solids range in the cooling water circuit, the controller being in communication with the dissolved solids sensor and being set via the user interface to a threshold level of total dissolved solids, whereupon the controller operates the bleed valve to drain cooling water from the cooling water circuit and replace drained water with fresher water through the water input.

4. The system of claim 3, wherein the brine sensor disposed within the drain line senses electrical conductivity of water that passes through the drain line of the water softener mechanism during a regeneration cycle, the controller being in communication with the brine sensor and the controller is further set via the user interface to detect a threshold level where the regeneration cycle for the water softener is to be engaged.

5. The system of claim 4, further including a water meter which registers water volume into the cooling water circuit, and the cooling water circuit including conduit for circulating water throughout the cooling water circuit, the controller unit being used to determine one or more of: the water volume or time within which the regeneration cycle should occur, or a high total dissolved solids set point.

6. The system of claim 5, wherein the water volume sensor is associated with a water meter which issues a signal to the controller when a set volume of water has passed through the water meter.

7. A system for operating an evaporative cooling assembly, comprising:
   a cooling water circuit including a cooling water reservoir, a heat exchanger which transfers latent heat to cooling water, an evaporative mechanism which evaporates cooling water to which latent heat has been transferred to thereby release latent heat, a bleed valve through which water is removed from the cooling water circuit, and a water input;
   a water volume sensor reading the water volume added to the cooling water circuit from the water input,
   a dissolved solids sensor in the cooling water reservoir that reads the total dissolved solids in the cooling water;
   a brine sensor disposed within a drain line which senses electrical conductivity of water that passes through the drain line; and
   a multi-function total dissolved solids controller with a user interface by which the controller is used to maintain a total dissolved solids range in the cooling water circuit, the controller being in communication with the dissolved solids sensor and being set via the user interface to a threshold level of total dissolved solids, whereupon the controller operates the bleed valve to drain cooling water from the cooling water circuit and replace drained water with fresher water through the water input according to a protocol set via the user interface and related to the threshold level.

8. The system of claim 7, further including a water softener mechanism in the cooling water circuit having a brine reservoir and the brine sensor disposed within the drain line which senses electrical conductivity of water that passes through the drain line of the water softener mechanism during a regeneration cycle, the controller being in communication with the brine sensor and controller, and the controller is further set via the user interface to detect a threshold level where the regeneration cycle for the water softener is to be engaged.

9. The system of claim 8, further including a water meter which registers water volume into the cooling water circuit, and a pumping circuit including conduit for circulating water throughout the cooling water circuit, the controller being used to determine one or more of: the water volume or time within which the regeneration cycle should occur, or a high total dissolved solids set point.

10. The system of claim 9, wherein the water volume sensor is associated with a water meter which issues a signal to the controller when a set volume of water has passed through the water meter.

11. A system for operating an evaporative cooling assembly, comprising:
    a cooling water circuit including a cooling water reservoir, a heat exchanger which transfers latent heat to cooling water, an evaporative mechanism which evaporates cooling water to which latent heat has been transferred to thereby release latent heat, a bleed valve through which water is removed from the cooling water circuit, and a water input;
    a water volume sensor reading the water volume added to the cooling water circuit from the water input,
    a dissolved solids sensor in the cooling water reservoir that reads the total dissolved solids in the cooling water;
    a multi-function total dissolved solids controller with a user interface by which the controller is used to maintain a total dissolved solids range in the cooling water circuit, the controller being in communication with the dissolved solids sensor and being set via the user interface to a threshold level of total dissolved solids, whereupon the controller operates the bleed valve to drain cooling water from the cooling water circuit and replace drained water with fresher water through the water input according to a protocol set via the user interface and related to the threshold level;
    a water softener mechanism in the cooling water circuit having a brine reservoir and a brine sensor disposed within a drain line which senses electrical conductivity of water that passes through the drain line of the water softener mechanism during a regeneration cycle, the controller being in communication with the brine sensor and controller, and the controller is further set via the user interface to detect a threshold level where a regeneration cycle for the water softener is to be engaged;

a water meter which registers water volume into the cooling water circuit and which issues a signal to the controller when a set volume of water has passed through the water meter;

and the cooling water circuit including conduit for circulating water throughout the cooling water circuit, the controller being used to determine one or more of: the water volume or time within which a softener regeneration should occur, or a high total dissolved solids set point.

12. A system for operating an evaporative cooling assembly, comprising:
   a water softener mechanism;
   a brine sensor disposed in a drain line of the water softener mechanism that senses electrical conductivity of water that passes through the drain line during a regeneration cycle;
   a cooling water circuit including:
      a water volume sensor reading a volume of water added to the cooling water circuit;
      a cooling water reservoir;
      a heat exchanger for transferring latent heat to cooling water;
      an evaporative mechanism which evaporates the cooling water to release latent heat;
      a dissolved solids sensor reading the total dissolved solids in the cooling water; and
      a bleed valve through which water is removed from the cooling water circuit; and
   a multi-function total dissolved solids controller in communication with the dissolved solids sensor, the bleed valve, and the brine sensor, wherein the controller is programmed with:
      a water volume threshold level that is based on a reading from the water volume sensor and corresponds to activation of the regeneration cycle of the water softener mechanism; and
      first and second dissolved solids threshold levels that are based on a reading from the dissolved solids sensor, the first dissolved solids threshold level being higher than the second dissolved solids threshold level; and wherein the controller is programmed to operate with the second dissolved solids threshold level when the reading from the water volume sensor meets or exceeds the water volume threshold level and a reading from the brine sensor indicates that regeneration of the water softener mechanism has not occurred.

13. The system of claim 3, wherein the brine sensor within the drain line senses the electrical conductivity of the water that passes through the drain line of the water softener mechanism during a regeneration cycle.

14. The system of claim 7, wherein the brine sensor within the drain line senses the electrical conductivity of the water that passes through the drain line of the water softener mechanism during a regeneration cycle.

15. The system of claim 11, further comprising a control valve for the water softener mechanism which switches the water softener mechanism through stages of the regeneration cycle.

16. The system of claim 12, further comprising a control valve for the water softener mechanism which switches the water softener mechanism through stages of the regeneration cycle.

17. The system of claim 11, wherein the controller is further in communication with the water softener mechanism and the controller is further programmed by the user to detect a threshold time when the regeneration cycle for the water softener mechanism is to be engaged.

18. The system of claim 12, wherein the controller is further in communication with the water softener mechanism and the controller is further programmed by the user to detect a threshold time when the regeneration cycle for the water softener mechanism is to be engaged.

19. The system of claim 15, wherein the controller is in communication with the water softener mechanism, and the controller is further programmed to start the regeneration cycle in the water softener mechanism when a threshold level is detected by the dissolved solids sensor.

20. The system of claim 16, wherein the controller is in communication with the water softener mechanism, and the controller is further programmed to start the regeneration cycle in the water softener mechanism when a threshold level is detected by the dissolved solids sensor.

* * * * *